(12) United States Patent
Jacobs et al.

(10) Patent No.: US 6,337,154 B1
(45) Date of Patent: Jan. 8, 2002

(54) BATTERY BOX WITH A METAL PLASTIC LAMINATE END

(75) Inventors: James K. Jacobs; Sankar Dasgupta, both of Toronto (CA)

(73) Assignee: Electrofuel Inc., Toronto (CA)

( * ) Notice: Subject to any disclaimer, the term of this patent is extended or adjusted under 35 U.S.C. 154(b) by 0 days.

(21) Appl. No.: 09/404,602

(22) Filed: Sep. 24, 1999

(51) Int. Cl.$^7$ .............................. H01M 2/04; H01M 2/06
(52) U.S. Cl. ...................... 429/175; 429/179; 429/176
(58) Field of Search ..................... 429/99, 127, 100, 429/152–154, 158–160, 162–163, 170–171, 175–176, 178–181, 185

(56) References Cited

U.S. PATENT DOCUMENTS

| | | | |
|---|---|---|---|
| 3,844,841 A | 10/1974 | Baker .......................... 136/111 |
| 3,992,225 A | * 11/1976 | Sykes |
| 4,060,670 A | 11/1977 | Tamminen .................. 429/154 |
| 4,092,464 A | 5/1978 | Dey et al. ................... 429/127 |
| 4,125,680 A | 11/1978 | Shropshire et al. ............. 429/4 |
| 4,145,485 A | 3/1979 | Kinsman ..................... 429/105 |
| 4,169,920 A | 10/1979 | Epstein ....................... 429/154 |
| 4,374,186 A | 2/1983 | McCartney et al. ......... 429/154 |
| 4,418,127 A | 11/1983 | Shambaugh et al. ............ 429/8 |
| 4,554,221 A | 11/1985 | Schmid .......................... 429/1 |
| 4,623,598 A | 11/1986 | Waki et al. ................... 429/162 |
| 4,659,636 A | 4/1987 | Suzuki et al. .................. 429/54 |
| 4,664,994 A | 5/1987 | Koike et al. .................. 429/163 |
| 4,678,725 A | 7/1987 | Kikuchi et al. ................ 429/53 |
| 4,719,159 A | 1/1988 | Clark et al. .................. 429/159 |
| 4,761,351 A | 8/1988 | Voorn ........................... 429/50 |
| 4,806,440 A | * 2/1989 | Hahs, Jr. et al. |
| 4,830,936 A | 5/1989 | Planchat et al. ............. 429/110 |
| 4,997,732 A | 3/1991 | Austin et al. ................ 429/153 |
| 5,017,441 A | 5/1991 | Lindner .......................... 429/9 |
| 5,057,385 A | 10/1991 | Hope et al. .................. 429/162 |
| 5,326,653 A | 7/1994 | Chang ......................... 429/162 |
| 5,368,958 A | 11/1994 | Hirai et al. .................. 429/211 |
| 5,368,959 A | 11/1994 | Koksbang et al. .......... 429/212 |
| 5,405,715 A | 4/1995 | Dawson et al. ................ 429/54 |
| 5,422,200 A | 6/1995 | Hope et al. .................. 429/157 |
| 5,445,856 A | 8/1995 | Chaloner-Gill ............ 428/35.9 |
| 5,487,958 A | 1/1996 | Tura ............................ 429/151 |
| 5,604,051 A | 2/1997 | Pulley et al. .................. 429/99 |
| 5,637,418 A | * 6/1997 | Brown et al. |
| 5,728,488 A | 3/1998 | Kranz et al. ................. 429/120 |
| 5,730,761 A | 3/1998 | Lake et al. ................. 29/623.2 |
| 5,731,100 A | 3/1998 | Fritts et al. ................... 429/84 |
| 6,117,576 A | * 9/2000 | Sugai |
| 6,146,778 A | * 11/2000 | Rouillard et al. |

FOREIGN PATENT DOCUMENTS

WO  WO 99/05731  2/1998

\* cited by examiner

*Primary Examiner*—Stephen Kalafut
*Assistant Examiner*—Susy Tsang
(74) *Attorney, Agent, or Firm*—Gowling Lafleur Henderson LLP

(57) ABSTRACT

A battery box sealable against moisture and oxygen ingress and liquid electrolyte egress. The battery box includes a first end, a second end opposite the first end, and sidewalls extending between the first and second ends to define a chamber for housing a number of rechargeable lithium battery cells. The first end and the sidewalls are metallic and have a substantially moisture and oxygen gas impervious joint between them. The second end is of a metal plastic laminate joinable to the sidewalls by a joining medium to form a substantially moisture and oxygen impervious joint therebetween. The second end has electrical connectors extending through it which enable substantially moisture and gas impervious connection to be made between current collectors of the lithium battery cells and the outside of the battery box.

9 Claims, 5 Drawing Sheets

US 6,337,154 B1

BATTERY BOX WITH A METAL PLASTIC LAMINATE END

FIELD OF THE INVENTION

This invention relates to the structure and assembly of rechargeable lithium batteries from rechargeable lithium battery cells.

BACKGROUND OF THE INVENTION

Rechargeable lithium battery cells are generally packaged as individual cell units in either cylindrical metal tubes or foil pouches. Each cell unit contains positive and negative electrodes, electrolyte and positive and negative current collectors. The current collectors must be accessible from outside of the package to enable electrical connection thereto.

Because of the materials used in a rechargeable lithium battery cell, the cell must be protected against moisture and oxygen ingress to avoid undesirable reactions. Furthermore, where liquid electrolytes are used, the packaging must also be capable of preventing liquid electrolyte egress. Cell seals are typically bulky and heavy, often representing in excess of 10% of cell weight and volume.

In order to meet various reserve capacity and voltage requirements, a plurality of lithium battery cells are typically enclosed in a plastic battery box with appropriate cell interconnections therebetween. The battery boxes primarily provide a structure for housing the battery cells. As the cells are themselves sealed against oxygen and moisture ingress and liquid electrolyte egress, it has not been found necessary or cost efficient in the past to provide a hermetically sealed battery box for lithium-ion cells.

In "foil" pouch packaged lithium battery cells, the use of a polymeric coated foil gives rise to a need to adequately ensure that leads from the current collectors don't contact the foil material and thereby "short-out". This problem is particularly acute along the outer edges of the foil covering which have usually been cut to size, thereby exposing the electrically conductive foil in close proximity to the leads, creating a need for shielding of the leads in this area.

It is an object of the present invention to provide a battery box for rechargeable lithium battery cells which is mechanically strong and hermetically sealable.

It is a further object of the present invention to provide a method for combining rechargeable lithium battery cells with a battery box enabling the elimination of foil encapsulation of individual cells and allowing thinner encapsulating materials.

SUMMARY OF THE INVENTION

A battery box sealable against moisture and oxygen ingress and liquid electrolyte egress. The battery box includes a first end, a second end opposite the first end, and side walls extending between the first and second ends to define a chamber for housing a number of rechargeable lithium battery cells.

The first end and the side walls are metallic and have a substantially moisture and oxygen gas impervious joint between them.

The second end is of a metal plastic laminate joinable to the side walls by a joining medium to form a substantially moisture and oxygen impervious joint therebetween. The second end has electrical connectors extending through it which enable substantially moisture and gas impervious connection to be made between current collectors of the rechargeable lithium battery cells and the outside of the battery box.

A method is provided for assembling a lithium battery from rechargeable lithium battery cell units which have positive and negative electrodes, an electrolyte and positive and negative current collectors. The method comprises the steps of:

Stacking a plurality of the cell units in a hermetically sealable box.

1. Providing an electrically insulating barrier between adjacent of the cell units and between the cell units and the box.
2. Making any desired electrical connections between selected of the positive and negative current collectors.
3. Providing electrical continuity between selected of the current collectors and an exterior of the battery box.
4. Hermetically sealing the battery box.

DESCRIPTION OF DRAWINGS

Preferred embodiments of the invention are described below with reference to the accompanying drawings in which.

DESCRIPTION OF PREFERRED EMBODIMENTS

Figure 1:
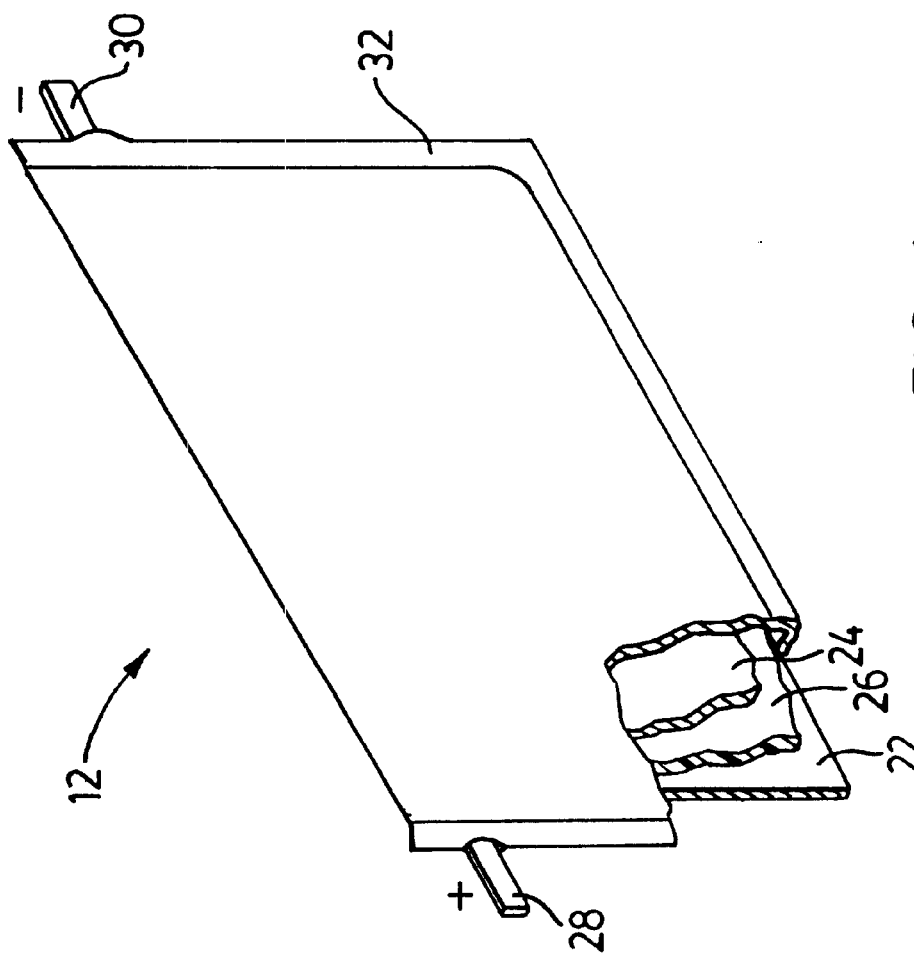
FIG. 1 is a perspective view, partially cut away of a prior art rechargeable lithium battery cell.

A rechargeable lithium battery according to the present invention is generally illustrated by reference 10 in FIG. 2. The battery 10 comprises three rechargeable lithium battery cells 12 stacked in a battery box 14 having a first end 16, a second end 18 and side walls 20. Although three lithium-ion cells are shown, the actual number may vary depending on the application.

FIG. 1 shows a typical foil wrapped lithium battery cell 12. The cell contains a positive electrode 22, a negative electrode 24, an electrolyte 26 and positive and negative "leads" or "current collectors", 28 and 30 respectively, enclosed in a poach 32. The leads 28 and 30 provide electrical communication between tile positive and negative electrodes 22 and 24 respectively and the outside of The pouch 32.

Rechargeable lithium batteries usually include a lithium-ion containing negative electrode, but may instead have a lithium metal or lithium negative alloy. Nevertheless, insofar as the teachings of this specification would apply to either a lithium metal or a lithium-ion containing negative electrode, the expressions "lithium battery cell" and "lithium battery" are intended to cover both variants.

As discussed in the background above, it is necessary to prevent moisture and oxygen contact with the inside of the lithium battery cell. In the past, this has been achieved on a cell by cell basis by encapsulating each lithium-ion cell in a substantially moisture and oxygen impervious, i.e. "hermetically sealed" shell. For example, in the case of the prior art lithium battery cell 12 in FIG. 1, the pouch 32 may be made from a suitable metal foil with a plastic laminate coating on at least the inside surface and preferably on both surfaces. Aluminum is the usually selected metal foil, however, copper may also be used or any other metal that can be formed to a suitable thickness and which exhibits good moisture and oxygen impermeability.

Unfortunately, a foil pouch requires a relatively thick foil to be sufficiently moisture and gas impermeable and the resulting foil package can represent up to 10% of cell weight and volume. Furthermore, the foil is prone to breaking in the corners if one tries to cram the lithium battery cell 12 into a tightly fitting container.

According to the present invention, the battery box 14 performs the function of sealing against moisture and oxygen ingress, unlike prior art battery boxes which basically acted as a holder for individually sealed cells. This allows the use of thinner and lighter pouches 32 and the possibility of non-metallic pouches 32, for example, of a polymer film. In the case of non-liquid electrolytes, packaging can basically be eliminated in favour of merely electrically isolating the individual lithium battery cells 12 from each other and the battery box 14. An advantage of non-metallic pouches is the avoidance of the risk of a short circuit between the current collectors or leads 28 and 30 and exposed metal foil along the edge of the pouch 32.

Where liquid electrolytes 26 are used, the pouch 32 merely has to be substantially impervious to electrolyte egress, which may be a lesser requirement to meet than oxygen or moisture ingress. The pouch 32 may therefore be much thinner and also less prone to leaking when "scrunched" 20 into a compact box than would be the case with a typical foil pouch. For the sake of clarity, it should be understood that by "moisture", it is intended herein to refer primarily to water, particularly in vapour form.

The battery box 10 has a first end 16 and side walls 20 of a metallic material such as tin. The first end 16 may be integral with the side walls 20, however, it may be more convenient for assembly to have a separate first end 16 joinable to the side walls 20 by any suitable means, such as soldering or possibly a polymeric adhesive.

The side walls 20 illustrated are in a generally rectangular configuration. This is not a requirement, but merely suits the shape of the lithium battery cells 12 illustrated. Other shapes may be selected as required.

The lithium battery cells 12 may be interconnected by interconnecting leads 34 in series or parallel as required. Principal output leads 36 connect the non-interconnected current collectors of opposite polarity on the first and last lithium battery cells 12 to electrical connectors 40 extending through the second end 18 of the battery box 14. Further output leads 38 connect the interconnecting leads 34 to further electrical connectors 40 extending through the second end 18. It is not necessary to make all of the cell interconnections internally as separate electrical connectors 40 for charge or discharge purposes may be provided for each positive and negative current collector, 28 and 30 respectively, and cell interconnections could then be made externally if desired.

The second end 18 of the battery box 14 must be sealably connectable to the side walls 20 while providing separate electrical connections through to the outside of the box at electrical connectors 40.

From the standpoint of oxygen and moisture impermeability, a metallic second end 18 would be preferred, however, this would require a suitably insulating sealing arrangement to provide discrete electrical connectors 40. It has been found that a suitable degree of moisture and air impermeability is obtained from a copper/thermoset/copper printed circuit board with suitable modifications in the region of the electrical connectors 40 as described below.

Figure 3:
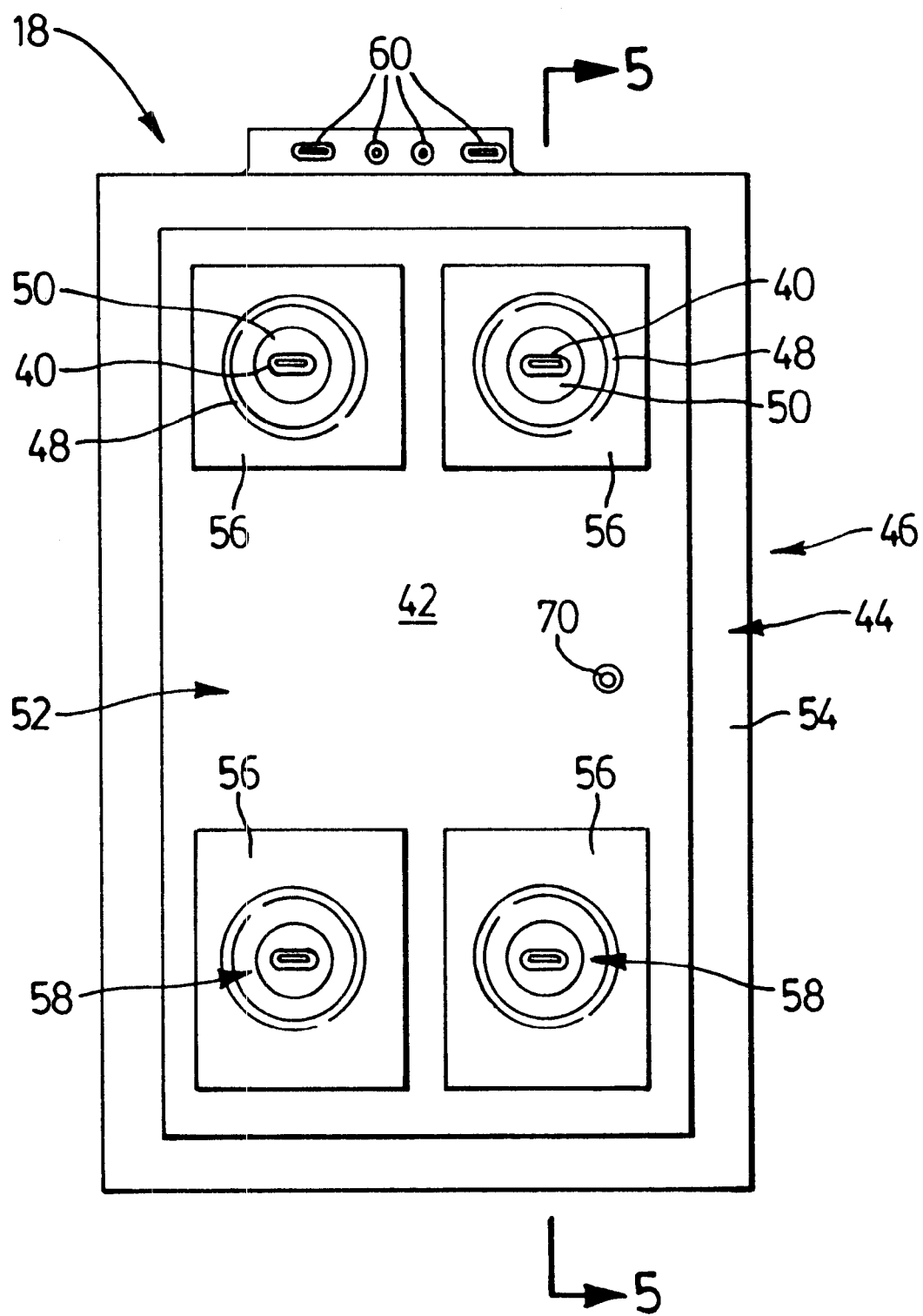
FIG. 3 is a top plan view of a second end of a battery box according to the present invention.
Figure 4:
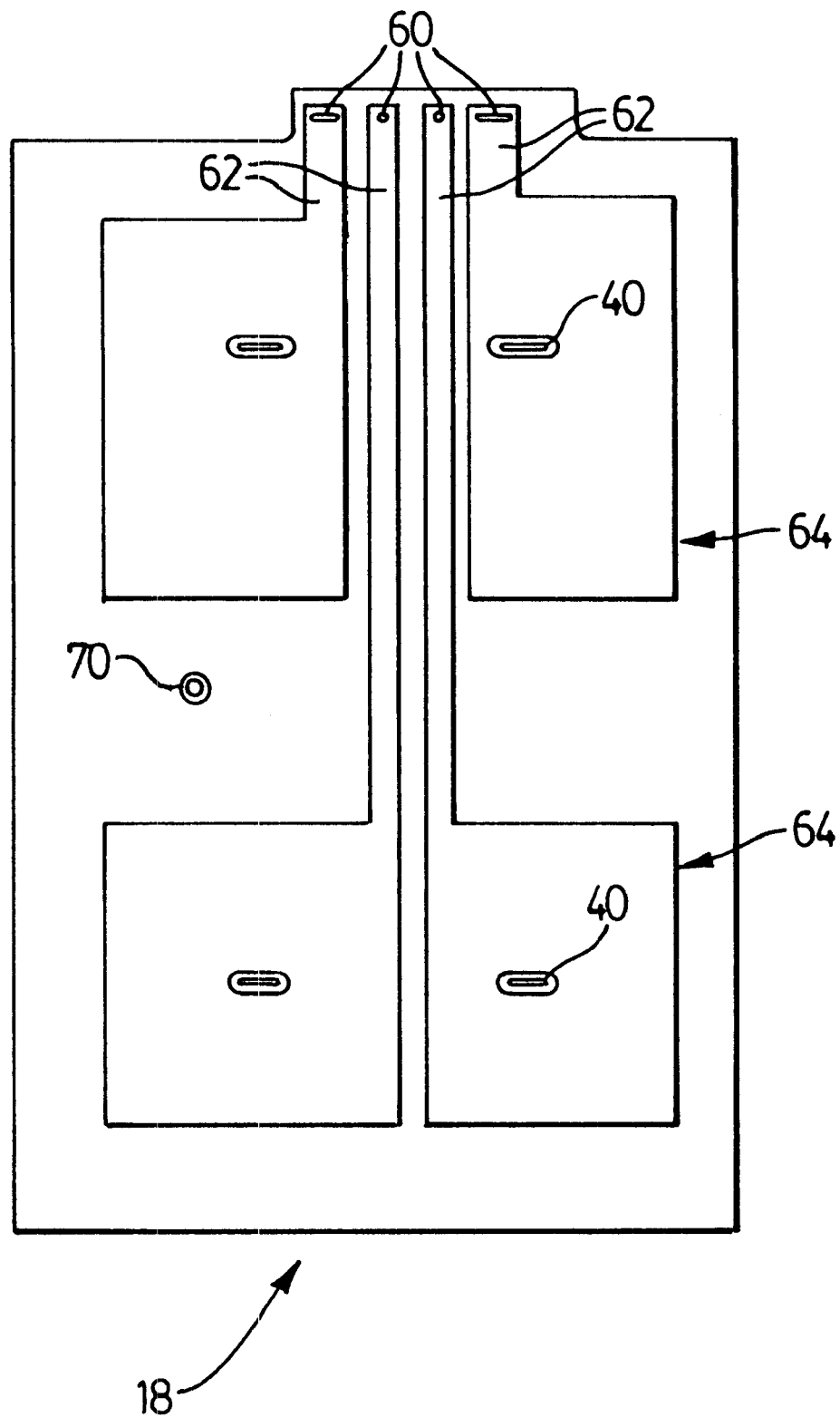
FIG. 4 is a bottom plan view of a second end of a battery box according to the present invention.
Figure 5:
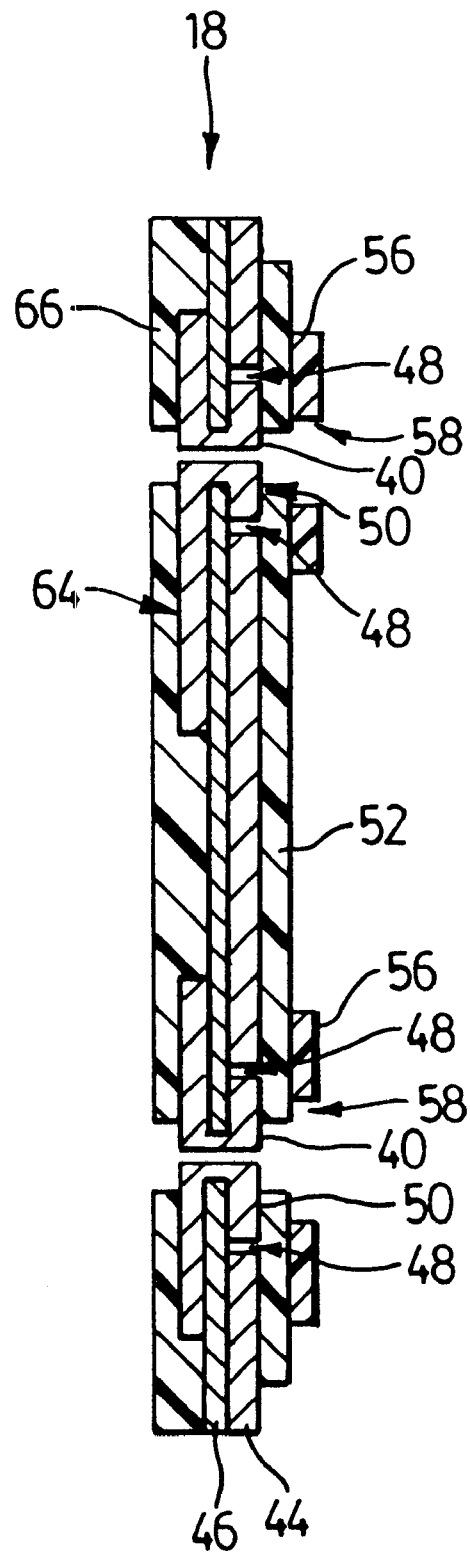
FIG. 5 is a section on line 5—5 of FIG. 3, showing only the sectioned surface.

Reference is now made to FIGS. 3, 4 and 5 which illustrate the second end 18 in detail. FIG. 3 illustrates an inner face 42 which has an inner foil layer 44, typically of copper, laminated over a non-conductive substantially rigid substrate 46 such as a typical thermoset plastic printed circuit board substrate. The inner foil layer 44 extends substantially over the entire inner face 42, but for circular breaches 48 extending about the electrical connectors 40 to create discrete electrically isolated connector areas 50.

An insulating coating 52, such as a plastic laminate, extends over the inner foil layer 44 leaving an exposed edge 54 extending about the perimeter of the inner face 42 and exposed areas which act as the electrical connectors 40. The exposed edge 54 enables a solder connection to be made between the second end 18 and the side walls 20.

To avoid oxygen and moisture migration through the substrate 46 at the breaches 48, a substantially moisture and oxygen impervious overlay 56 is placed over the breaches 48. The overlay 56 may be of an adhesive foil and may have a non-conductive polymeric coating facing into the battery box 14. Each overlay 56 has a circular opening 58 extending through it and spaced apart from the associated electrical connector 40 to expose the connector 40 and avoid electrical conductivity therebetween.

The electrical connectors 40 may be trough plated holes extending through he substrate 46 between the adjacent portions of the inner foil layer 44 and au outer foil layer 64. The electrical connectors 40 provide electrical continuity between the conductive layers inside and the outside of the battery box 14. As such, any desired electrical connections could be made directly to the electrical connectors 40. Nevertheless, it generally proves more convenient to provide electrical terminals along an edge of the strip, such as battery terminals 60 in FIGS. 3 and 4 which may also be through plated holes. The battery terminals 60 are electrically connected to respective of the electrical connectors 40 by conductor strips 62. The conductor strips 62 can be formed in the outer foil layer 64 on an outer face of the second end 18 by etching away portions of the outer foil layer 64, leaving discrete conductor strips 62.

An outer insulating coating 66, such as a plastic laminate, may be applied over the outer foil layer 64 to avoid undesirable electrical contact with the outer foil layer 64.

Figure 2:
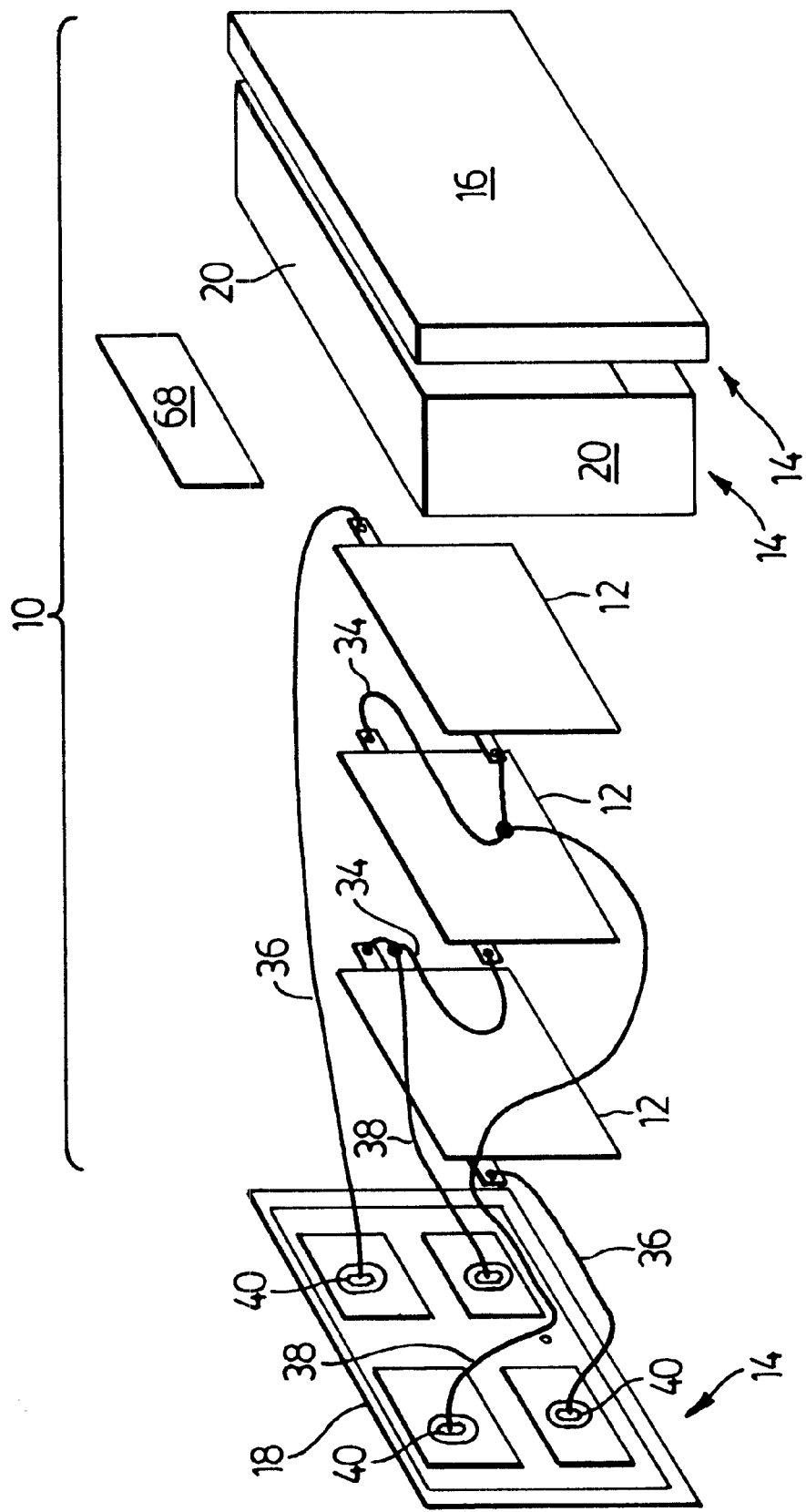
FIG. 2 is an exploded perspective view of a rechargeable lithium battery according to the present invention.

The battery box 14 may optionally contain electronic circuitry, such as schematically illustrated at reference 68 in FIG. 2, connected to the lithium battery cells 12 to monitor the battery charging and discharging process. Alternatively, the electronic circuitry 68 may be externally connected to the battery terminals 60 and not necessarily part of the battery 10.

A sealable port 70 may be provided to enable evacuation and sealing or backfilling (wholly or partly) with an appropriate potting material. The sealable port 70 may be a through plated opening sealable by solder as with the electrical connectors 40.

The above description is intended in an illustrative rather than a restrictive sense. Variations to the specific components and methodology described may be apparent to persons skilled in the relevant art or arts. Insofar as such variations are within the spirit and scope of any of the claims set out below, they are to be considered as covered by those claims.

The embodiments of the invention in which an exclusive property or priviledge are claimed are defined as follows:

1. A battery box sealable against moisture and oxygen ingress and liquid electrolyte egress, said battery box comprising:

a first end, a second end opposite said first end and side walls extending between said first and second ends to define a chamber for housing a plurality of lithium battery cells;

said first end and said side walls being metallic and having a substantially moisture and oxygen gas impervious, joint therebetween;

said second end being joinable to said side walls by a joining medium to form a substantially moisture and oxygen impervious joint therebetween;

said second end having electrical connectors extending therethrough which permit substantially moisture and oxygen gas impervious connection to be made between current collectors of said lithium battery cells and an outside of said battery box;

said second end further having a substantially moisture and oxygen impervious metallic inner foil layer laminated over a non-conductive, substantially rigid substrate, said inner foil layer covering substantially all of said substrate but having a plurality of discrete connector areas electrically isolated from the remainder of said inner foil layer by respective breaches in said inner foil layer;

an insulating coating extending over said inner foil layer leaving an exposed edge of foil extending about said second end for securement to said side walls;

said electrical connectors extending between said discrete connector areas and said outside of said battery box;

a substantially oxygen and moisture impervious overlay covering each said breach and having an opening therethrough extending about and spaced apart from said electrical connectors.

2. The battery box as claimed in claim 1 wherein:

said second end is manufactured from a foil/plastic/foil printed circuit board;

said insulating coating over said foil is a plastic laminate;

said breaches are etched out of said inner foil layer prior to application of said insulating coating;

said connectors are through plated openings;

said second end has an outer foil layer on an opposite side of substrate from said inner foil layer;

said outer foil layer is divided by gaps therein into a plurality of discrete conductor strips electrically isolated one from another, each said conductor strip electrically communicating with a respective of said connectors and terminating in a respective battery terminal; and, said first and second ends are joinable to said side walls by soldering to form said substantially moisture and oxygen gas impervious joints therebetween.

3. The battery box as claimed in claim 2, further having a sealable port therethrough for evacuation of said battery box.

4. A rechargeable lithium battery comprising a plurality of rechargeable lithium battery cells hermetically sealed in the battery box as claimed in claims 1, 2 or 3.

5. The rechargeable lithium battery as claimed in claim 4 wherein each said rechargeable lithium battery cell comprises;

positive and negative electrodes, an electrolyte and positive and negative current collectors;

said rechargeable lithium battery cells are stacked in said battery box with an insulating medium between adjacent of said cell units and between said cell units and said battery box;

said current collectors are connected in series and to said connectors.

6. The rechargeable lithium battery as claimed in claim 5 wherein:

said electrolyte is a liquid;

each said rechargeable lithium battery cell is sealed in a non-conducting electrolyte impervious pouch;

respective leads extend from each said positive and negative current collector through said pouch in an electrolyte impervious manner.

7. The rechargeable lithium battery as claimed in claim 5 wherein said battery box is filled with a potting material.

8. The rechargeable lithium battery as claimed in claim 6 wherein said battery box is filled with a potting material.

9. The rechargeable lithium battery as claimed in claim 6 further having electronic circuitry inside of said box connected to said rechargeable lithium battery cells to monitor charging and discharging.

* * * * *